UNITED STATES PATENT OFFICE.

CHARLES DE LA HARPE AND RUDOLF BURCKHARDT, OF BASEL, SWITZERLAND, ASSIGNORS TO THE FIRM OF DYE-WORKS FORMERLY L. DURAND, HUGUENIN & CO., OF BASEL, SWITZERLAND.

LEUCO DYESTUFFS OF THE GALLOCYANIN SERIES AND PROCESS OF MAKING SAME.

1,000,899. Specification of Letters Patent. Patented Aug. 15, 1911.

No Drawing. Application filed April 3, 1911. Serial No. 618,691.

*To all whom it may concern:*

Be it known that we, CHARLES DE LA HARPE, chemist, and RUDOLF BURCKHARDT, chemist and doctor of philosophy, both citizens of the Swiss Republic, and residents of Basel, Switzerland, have invented new Leuco Dyestuffs of the Gallocyanin Series and a Process of Making Same, of which the following is a full, clear, and exact specification.

It is known that the amins of the aliphatie series can combine with gallocyanins. On the other hand the aralkylamins have not hitherto been combined with gallocyanins.

According to the present invention new leuco dyestuffs of the gallocyanin series are made by reaction between gallocyanins and aralkylamins and reduction of the resulting condensation products. The reaction between gallocyanins and aralkylamins is of a different nature from that between gallocyanins and alkylamins and yields products which dissolve in concentrated sulfuric acid to a red solution instead of to a blue solution. These products therefore, probably have the same constitution as the condensation products from arylamins and gallocyanins, as further evidence of which may be cited the fact that when warmed with dilute sulfuric acid they yield oxygallocyanins, the aralkylamino group being exchanged for the hydroxyl group. These condensation products, when they contain no free acid residues such as sulfonic or carboxylic groups are difficultly soluble in alkalis; the products from gallic acid gallocyanins, on the other hand, are soluble in alkalis to reddish violet solutions. When these solutions are boiled the corresponding pyrogallol derivatives are obtained, which are insoluble in sodium carbonate solution. These new aralkylamino-gallocyanins are also little soluble in very dilute acids, but can be converted into easily soluble leuco derivatives by reduction with the usual reducing agents. These soluble derivatives yield beautiful greenish blue tints on chrome mordants.

The new aralkylamino-gallocyanins differ advantageously from the alkylamino-gallocyanins in that they yield much less violet tints.

As compared with the aryl-amino-gallocyanins, the following advantages may be claimed for the new aralkylamino-gallocyanins. They are much more easily reduced to leuco derivatives, which are much more soluble than those from the arylamino-gallocyanins and are therefore more easily applicable in printing. The condensation of the aralkylamin with the gallocyanin dyestuff is accompanied by formation of leucogallocyanins; this formation can, however, be in greater part avoided by addition of easily reducible substances or by passage of air through the mass, as recommended in United States Patent No. 897,619 dated Sept. 1. 1908 and in British Letters Patent No. 20368 of 1908.

The following examples illustrate the invention:—

Example I: 34 kilos of the gallocyanin derived from nitrosodimethylanilin and gallic acid are mixed with 60 kilos of alcohol and 50 kilos of benzylamin and the mixture is heated at 50° C. in a reflux apparatus while air is passed through it, until the gallocyanin dyestuff or its leuco derivative has disappeared. The mixtutre is allowed to cool, filtered and the solid matter washed with alcohol and pressed. The condensation product thus obtained is boiled with 300 liters of water and 10 kilos of anhydrous sodium carbonate until the product is precipitated. The product decarboxylated in this manner is mixed with 400 liters of water and 40 kilos of hydrochloric acid and reduced by means of 7 kilos of zinc dust at about 50° C. The mixture is filtered and the leuco dyestuff precipitated from the filtrate by common salt. Obviously the carboxylated dyestuff may be converted into a leuco derivative.

Example II: 36 kilos of the gallocyanin derived from nitrosodiethylanilin and gallamid, or another gallocyanin are mixed with 100 kilos of nitrobenzene, 10 kilos of dinitrobenzene and 36 kilos of benzylamin, and the mixture is heated until the suspended dyestuff dissolves in concentrated sulfuric acid to a red solution. The mixture is then allowed to cool, filtered and the solid matter washed with alcohol and pressed. The product is then introduced into 500 liters of water and 50 kilos of hydrochloric acid, warmed to 50° C., and reduced by means of 10-12 kilos of zinc dust. The mixture is then filtered and the leuco dyestuff is precipitated by common salt.

What we claim is:

1. The described process for the manufacture of new leuco dyestuffs of the gallocyanin series consisting in causing an aralkylamin to react with a gallocyanin and converting the condensation product thus obtained into a leuco derivative by treating it with the usual reducing agents.

2. The described process for the manufacture of new leuco dyestuffs of the gallocyanin series consisting in causing an aralkylamin to react with a gallic acid gallocyanin, decarboxylating the resulting condensation product by its heating in a liquid medium and finally converting the resulting decarboxylated product thus obtained into a leuco derivative by treating it with the usual reducing agents.

3. The described process for the manufacture of new leuco dyestuffs of the gallocyanin series consisting in causing an aralkylamin to react with the gallocyanin in presence of a substance which does not attack too quickly the aralkylamin and is capable of supplying with oxygen and thus of avoiding the formation of leucogallocyanin, and converting the condensation product thus obtained into a leuco derivative by treating it with the usual reducing agents.

4. The described process for the manufacture of new leuco dyestuffs of the gallocyanin series consisting in causing an aralkylamin to react with a gallocyanin in the presence of easily reducible substance and converting the condensation product thus obtained into a leuco derivative by treating it with the usual reducing agents.

5. The described process for the manufacture of new leuco dyestuffs of the gallocyanin series consisting in causing an aralkylamin to react with a gallic acid gallocyanin in presence of a substance which does not attack too quickly the aralkylamin and is capable of supplying with oxygen and thus of avoiding the formation of leucogallocyanin, decarboxylating the resulting condensation product by its heating in a liquid medium and finally converting the resulting decarboxylated product thus obtained into a leuco derivative by treating it with the usual reducing agents.

6. The described process for the manufacture of new leuco dyestuffs of the gallocyanin series consisting in causing an aralkylamin to react with a gallic acid gallocyanin in the presence of an easily reducible substance, decarboxylating the resulting condensation product by its heating in a liquid medium and finally converting the resulting decarboxylated product thus obtained into a leuco derivative by treating it with the usual reducing agents.

7. As a new product, the described leuco derivative of the condensation product of a gallocyanin with an aralkylamin, yielding on chrome mordants beautiful greenish blue tints much less violet than the tints obtained with the corresponding alkylamino-gallocyanin, being much more soluble in water than the leuco derivative of the corresponding arylamino-gallocyanin and therefore also more easily applicable in printing and giving on oxidation an aralkylamin gallocyanin which is little soluble in very dilute acids, but dissolves in concentrated sulfuric acid to a red solution and is transformed by its warming with dilute sulfuric acid into the corresponding oxygallocyanin.

8. As a new article of manufacture, the described leuco derivative of the decarboxylated condensation product of a gallic acid gallocyanin with an aralkylamin, yielding on chrome mordants beautiful greenish blue tints much less violet than the tints obtained with the corresponding not decarboxylated alkylamino-gallocyanin, being much more soluble in water than the leuco derivative of the corresponding not decarboxylated arylamin gallocyanin and therefore also more easily applicable in printing and giving on oxidation a decarboxylated aralkylamino-gallocyanin which is little soluble in very dilute acids, but dissolves in concentrated sulfuric acid to a red solution, is transformed by its warming with dilute sulfuric acid into the corresponding pyrogallol-oxy-gallocyanin and is insoluble in sodium carbonate solution.

In witness whereof we have hereunto signed our names this 21 day of March, 1911, in the presence of two subscribing witnesses.

CHARLES DE LA HARPE.
RUDOLF BURCKHARDT.

Witnesses:
  Geo. GIFFORD,
  AMAND RITTER.

---

Copies of this patent may be obtained for five cents each, by addressing the "Commissioner of Patents, Washington, D. C."